: 3,354,142
Patented Nov. 21, 1967

3,354,142
HARMIDINE AND DERIVATIVES THEREOF
Salimuzzaman Siddiqui, Karachi, Pakistan, assignor to Pakistan Council of Scientific and Industrial Research, Karachi, Pakistan
No Drawing. Filed Aug. 21, 1962, Ser. No. 218,460
2 Claims. (Cl. 260—236)

This invention relates to a newly discovered alkaloid and derivatives thereof, and in particular, to a process for the isolation of an alkaloid, hereby named "harmidine" from *Peganum harmala*.

*Peganum harmala* is known to contain four alkaloids, namely, harmaline $C_{13}H_{14}ON_2$ reported by Goebel as far back as 1841 [cf. Liebigs Ann., 38, 363 (1841)], harmine $C_{13}H_{12}ON_2$ isolated by Fritsche [cf. Liebigs Ann., 64, 365 (1847)], harmalol $C_{12}H_{12}ON_2$ noted by Goebel and prepared by Fischer and Taube [cf. Ber. deut. chem. Ges., 18, 400 (1885)], and peganine $C_{11}H_{12}ON_2$ obtained by Merck and later identified with vasicine isolated earlier by Hooper from *Adhatoda vasica* Nees [cf. Pharm. J., 18 (iii), 841 (1888)].

An object of this invention is the discovery of a new alkaloid present in *Peganum harmala*.

Another object is to provide derivatives of this new alkaloid.

Still another object is to provide processes for the production of said new alkaloid and the derivatives thereof.

Other objects and advantages of this invention will become apparent upon further study of the specification and appended claims.

Employing mild operating conditions, a reinvestigation of the seeds of *Peganum harmala* has yielded a hitherto unrecorded base named "harmadine," in a yield of 1.7%, in addition to harmine (M.P. 266° C.) and peganine (vasicine) (M.P. 198° C.) in yields of 0.8 and 0.1%, respectively.

This hitherto unrecorded base, harmidine, which analyzed for $C_{13}H_{14}ON_2$ melts at 257–258° C., 18° higher than the melting point recorded for harmaline (239–240° C.), and shows a depression of 25° on admixture with harmine. It gives crystalline salts, all of which, except for the hydrohalides, have higher melting points than those noted for the corresponding salts of harmaline.

The novel compounds of this invention include:

"harmidine"
harmidine hydrochloride
harmidine hydroiodide
harmidine picrate
dihydro harmidine
harmidine chloroplatinate
dibromo harmidine
monobromo harmidine
desmethyl harmidine—"harmidol"
harmidol trihydrate
harmidol hydrochloride
harmidol picrate
harmidol chloroplatinate According to the present invention, the process for the isolation of the alkaloid "harmidine" from *Peganum harmala*, comprises the steps of:

(1) Leaching, by percolation for example, powdered seeds of *Peganum harmala* with an alcohol such as methanol and ethanol to obtain a solid residue and a liquid extract;

(2) Removing the alcohol from said liquid extract to obtain a viscous residue;

(3) Partitioning the resulting viscous residue between water and an ether, preferably petroleum ether, thereby obtaining an ethereal and an aqueous phase;

(4) Treating the aqueous phase with an alkaline reagent, preferably ammonia, to bring the pH from the original 4.5 to about 6.5, and then with ammonium sulphate, removing the resinous impurities, adding activated charcoal to the solution and filtering;

(5) Adding a concentrated solution of iodide ion, preferably a solution of an alkali metal iodide, such as potassium iodide, to the filtrate and collecting the precipitate of crude hydroiodides of the bases;

(6) dissolving the crude hydroiodides in a hot dilute alcohol such as methanol, charcoaling and filtering through a hot funnel, and cooling the resulting clear solution, thereby obtaining a golden yellow crystallizate of the hydroiodide;

(7) treating the hydroiodide with a weak (10%) alkaline solution, preferably with dilute ammonia with slight warming on the water-bath, collecting the liberated buff coloured bases, and dissolving the bases in dilute acetic acid, keeping the pH of the solution at about 6–6.5;

(8) adding dilute ammonia to the clear acetic acid solution of the bases till the pH is brought to about 7.2, heating the solution on the water-bath to hydrolyze the acetate of the weaker base harmine, filtering off the latter base while hot, and repeating this step with the filtrate showing a reduced pH around 6.8 till there is no further precipitation of the base at pH 7.4 in the hot; and (9) treating the final filtrate obtained in step (8) with an excess of ammonia to bring the pH above 8 to free the base, and purifying the resultant base by crystallization, for example, utilizing such solvents as a mixture of benzene and methanol or benzene and ethanol, leading to the crystalline alkaloid harmidine, M.P. 257–258° C.

Characterization of harmidine

Harmidine is fairly soluble in mixtures of benzene and methanol or ethanol, sparingly soluble in these solvents individually, and nearly insoluble in ether (diethyl) and petroleum ether. It crystallizes from these solvents in light amber coloured prismatic plates, which when crushed form a white powder melting at 257–258° C. On passing the base in a benzene and alcohol medium through a column filled with neutral or basic alumina, the melting point is slightly lowered, but is restored on crystallization from the mixed solvents.

Harmidine hydrochloride

On treating the base with an excess of alcoholic hydrochloric acid, a yellow coloured paste is formed, which can be dissolved in ethyl alcohol. On diluting such as alcoholic solution with ether, harmidine hydrochloride is precipitated out, and on crystallization from alcohol yields long yellow needles, M.P. 236° C., empirical formula $C_{13}H_{14}ON_2 \cdot HCl$.

Harmidine hydroiodide

On treating a solution of the base in dilute acetic acid with a concentrated solution of potassium iodide, a yellow crystallizate is obtained, which when vacuum filtered and washed with water, and crystallized from alcohol, forms bright yellow rods and needles melting at 242° C.

Harmidine picrate

On adding a solution of picric acid in methanol to a methanol benzene solution of harmidine, yellow microcrystalline precipitate is obtained which soon changes its colour to orange red prismatic rods of harmidine picrate, M.P. 246° C.

Dihydro harmidine

When two g. of harmidine are suspended in 50 ml. of 2:1 water and concentrated hydrochloric acid, and 5 g.

of zinc dust are gradually added with constant heating in a water bath with occasional shaking till the yellow colour of the reaction mixture disappears, and unreacted zinc is filtered off, and the clear solution strongly is ammoniated, a white precipitate is obtained which consists of the reduced base and zinc hydroxide. This latter mixture is then vacuum filtered and washed. The reduced base is extracted out by hot ethyl acetate, the ethyl acetate solution being washed with water, dried over anhydrous sodium sulphate, filtered and freed of the solvent on the water bath. On crystallization of the residue from alcohol, dihydroharmidine is obtained as colourless needles (1 g.) which melt at 199° C. These crystals give no depression in melting point on admixture with an authentic sample of tetrahydroharmine. Empirical formula $C_{13}H_{16}ON_2$.

Harmidine chloroplatinate

Harmidine hydrochloride is dissolved in water and a 3% solution of $H_2PtCl_6$ is added to it while the container is cooled with ice. The resulting precipitate is washed with water, dried and crystallized through moist acetone. The chloroplatinate is obtained in orange yellow prismatic rods and needles M.P. 259–260° C., the empirical formula being $(C_{13}H_{14}ON_2)_2H_2PtCl_6$.

Bromination in chloroform medium

Harmidine (0.5 g.) is dissolved in 30 ml. of dry chloroform with the help of 2–3 drops of glacial acetic acid, and 23.4 ml. of 1.6% bromine in chloroform is slowly run into the ice-cooled solution with constant shaking. The reaction mixture is kept in the cold overnight, and the orange crystalline deposit (needles and rods) of the bromo product is collected and washed with chloroform, M.P. 178° C. When refluxed with alcohol for 5 to 10 minutes, it is converted into yellow coloured needles which melt at 252° C. Empirical formula of both crystalline forms is $C_{13}H_{14}ON_2Br_2 \cdot H_2O$.

Bromination in acetic acid medium

To a solution of 0.5 g. of harmidine in 10% acetic acid was added with ice cooling a solution of 1.548% bromine prepared by dissolving 1.548 g. bromine in 5 g. glacial acetic and then diluting it with water. After the drop by drop addition of 24.2 ml. (corresponding to 2 atoms of bromine) with constant shaking, the reaction mixture was allowed to stand in the cold. The greenish yellow glistening needles of the bromo product which soon starts to form, are collected, washed with cold water and dried on porous plate, M.P. 252° C. (yield nearly theoretical) empirical formula $C_{13}H_{14}ON_2Br_2 \cdot H_2O$.

Bromination in a dilute sulfuric acid medium

The addition of 2 atoms of bromine in the acetic acid medium used in the preceding experiment, to a solution of 0.5 g. harmidine in 5% sulfuric acid give a bright yellow crystalline bromo product (needles) which melt at 252° C., empirical formula $C_{13}H_{14}ON_2Br_2 \cdot H_2O$.

The dibromo harmidine product as prepared in the various mediums is fairly soluble in water, methanol and ethanol, less soluble in chloroform, and practically insoluble in ethyl acetate, ether and petroleum ether.

Monobromo harmidine

On treatment of the bromo product

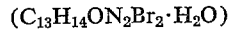
$(C_{13}H_{14}ON_2Br_2 \cdot H_2O)$ with 10% $NH_4OH$, a white crystalline base is obtained which on recrystallization with methanol forms prismatic rods of mono-bromo-harmidine, M.P. 220° C., readily soluble in methanol and ethanol, less so in benzene, sparingly soluble in ethyl acetate and nearly insoluble in ether and petroleum ether, empirical formula—

$C_{13}H_{14}ON_2Br$

Desmethyl harmidine—"Harmidol"

Finely powdered harmidine (0.5 g.) is refluxed with potassium iodide on a sand bath for about 15 minutes, after which the heating is continued on a boiling water bath till crystallization starts, after which it is allowed to stand in the cold. The crystallizate is vacuum filtered, washed with a dilute solution of potassium iodide, and recrystallized through water after charcoaling. The hydroiodide thus obtained yields on treatment with ammonia an orange coloured phenolic base which crystallizes in golden yellow prismatic rods from methanol, and is readily soluble in dilute alkali. The desmethyl base, which is hereby named harmidol, melts after a few crystallizations from the same solvent at 259–260° C., as against M.P. 212° C. recorded for harmalol. It is fairly soluble in acetone and alcohol, less so in ethyl acetate, sparingly soluble in benzene and ether, and nearly insoluble in petroleum ether. After drying to constant weight over phosphorus pentoxide, at 100° C. in vacuo it analyzes for $C_{12}H_{12}ON_2$.

Harmidol trihydrate

When crystallized through dilute methanol, harmidol forms golden yellow prismatic rods of the hydrate, which froths up at 135° C., melts down at 259–260° C., and analyzes after drying in air for $C_{12}H_{12}ON_2 \cdot 3H_2O$.

Harmidol hydrochloride

The hydrochloride of the base is obtained on bringing the reactants together in alcoholic medium and precipitating the salt with the addition of ether. It is readily soluble in water and methanol, less so in alcohol, and crystallizes through these solvents in yellow coloured prismatic rods and plates, M.P. 265–267° C.

Harmidol picrate

Harmidol picrate is obtained on adding a dilute aqueous solution of picric acid to a 1% acetic acid solution of the base. It is fairly soluble in moist acetone and methanol, sparingly in hot water, and crystallizes from the solvents in aggregates of orange coloured prismatic rods and plates, melting at 249–250° C.

Harmidol chloroplatinate

Harmidol chloroplatinate is prepared by dissolving the hydrochloride of the base in water and treating it with an excess of 3% solution of chloroplatinic acid in water. It crystallizes from moist acetone in orange coloured prismatic rods and melts at 294–295° C.

The seeds of *Peganum harmala*, which grow in abundance in Pakistan and some of the neighbouring countries, are highly reputed in the indigenous system of medicine for the treatment of a variety of ailments. They have long been used as an anthelmintic and also as narcotics, and the source of a red dye. The therapeutic applications of harmala alkaloids as protozooicidal agents, coronary dilators and ecbolics, and in nervous diseases, for example in the treatment of post-encephalitic conditions, have been discussed by a number of authors [cf., The Plant Alkaloids by T. A. Henry (J. & A. Churchill Ltd., 1949), p. 495].

More specifically, pharmacological studies on harmidine have shown that it possesses very valuable physiological properties, such as anti-convulsion effect in electro-shock, inhibition of the conditioned escape reaction and the oxygen consumption, radiation protection effect, micro-, bacterio- and tuberculostatic effects, monoaminooxydase inhibition in vitro, lowering of the arterial blood pressure, bradycardiac effect, dilatation of the coronary blood vessels, and increased coronary flow. It will be noted that certain pharmacological properties such as radiation protection effect have hitherto not been reported for the known harmala alkaloids. In its property of lowering blood pressure, harmidine has been found to be about 10 times as potent as harmaline. Toxicologically, harmidine is less toxic than harmaline and approximately equal to harmine. Thus it is to be expected that the compounds of this invention are useful as tools in the alkaloid art as therapeutic remedies.

Without further analysis, it is believed that one skilled in the art, can, using the preceding description, utilize the present invention to its fullest extent. The following preferred specific embodiment is, therefore, to be construed as merely illustrative, and not limitative of the remainder of the specification and claims in any way whatsoever.

EXAMPLE

Eight kg. of *Peganum harmala* seeds were powdered to 30 mesh and percolated 8 times with ethanol at room temperature. On removal of the solvent from the combined percolates at reduced pressure below 40° C., a reddish green, viscous residue (2.9 kg.) was obtained, which was divided up into petroleum ether and water soluble fractions by a process of repeated partitioning in the two solvents. In the course of this operation it was noted that hardly any material insoluble in the two solvents is left over, if there has been no over-heating in the removal of the solvent from the alcoholic percolates. The water-soluble layer was freed of the residual organic solvent in vacuo, treated with ammonia to bring the pH from the original 4.5 to 6.5 and then with ammonium sulphate. The resulting precipitate of dark brown resinous impurities was cottoned off, and the slightly turbid reddish solution was heavily charcoaled and filtered, whereby the colour of the solution became much lighter. On the addition of a concentrated solution of potassium iodide to the filtrate, a light brown crystalline precipitate of the hydroiodide of the bases was obtained, which was vacuum filtered, washed with water and dried, the yield being 600 g. On concentration and treatment with potassium iodide the washings gave a further quantity of hydroiodide (40 g.), bringing the total yield of the crude iodide to 640 g.

*Isolation of harmine and harmidine*

The total crude hydroiodide (640 g.) was dissolved in a dilute alcohol in the hot, charcoaled and filtered through a hot funnel. The charcoal mud was repeatedly extracted while hot with dilute alcohol with the addition of small quantities of acetic acid, and the washings added on to the main filtrate. On repetition of the process, a clear, orange coloured solution of the hydroiodide was obtained, which on cooling, deposited a golden yellow crystallizate of the hydroiodide, the mother liquors yielding further quantities of it on concentration (total yield 490 g.).

For the liberation of the base, the hydroiodide was treated with 10% ammonia with slight warming; the buff coloured base was vacuum filtered and washed first with 2% ammonia, then repeatedly with water, and dried on porous plates (270 g.). The total base was dissolved in 10% acetic acid with slight warming, keeping the pH of the solution between 6 and 6.5. After cooling to room temperature, the slightly reddish solution was charcoaled and filtered, and its pH was brought up to about 7.2 with the addition of dilute ammonia, taking care that no precipitation of the base occurs at room temperature. On heating the orange coloured solution in a boiling water bath, a sizable crystallizate was formed which showed a tendency to redissolve on cooling; it was, therefore, vacuum filtered hot, washed with water and dried (M.P. 260–262° C.). To the filtrate, showing a reduced pH around 6.8, ammonia is again added to bring the pH up to about 7.4 and the latter heating and filtering steps are repeated to obtain a second crop of crystals. A third crop of crystals was obtained on bringing the pH to 7.4–7.6 and heating in a water bath till the pH came down to 7.4; this crop of crystals had a pinkish colour and M.P. 236–240° C. The filtrate was now treated with an excess of fairly concentrated ammonia bringing the pH to above 8, and the crystallizate thereby obtained had a M.P. of 252–254° C.

On repeated crystallization from a mixture of methanol and benzene in which both the bases are appreciably more soluble than in either of the two solvents individually, the fractions melting above 260° C. gave harmine M.P. 266° C. (65 g.). Its hydrochloride showed M.P. 285° C., and the tetrahydroharmine prepared from it melted at 199° C. The fractions melting between 250–254° C. yielded harmidine (140 g.) which melted at 257–258° C. and gave a depression of 25° in its mixed melting point with harmine.

The fractions melting in the range of 236–240° C., when treated in the manner described for the isolation of harmine and harmidine from the total base, were ultimately separated into the two bases, giving once again low melting intermediate fractions M.P. 236–240° C. which appeared to be eutectic mixtures of the two.

Hydrochloride, yellow prismatic rods, M.P. 236° C.
Hydroiodide, yellow needles and rods, M.P. 242° C.
Picrate, brilliant red needles, M.P. 246° C.
Chloroplatinate, orange prismatic rods and needles, M.P. 259–260° C.
Dihydroharmidine, colourless needles, M.P. 199° C.

On bromination in chloroform solution at 0° C., an orange bromo product, $C_{13}H_{14}ON_2Br_2 \cdot H_2O$, indicating an olefinic linkage, M.P. 178° C., which on refluxing with alcohol for 5 to 10 minutes is converted into yellow coloured needles, M.P. 252° C., also analyzing for $C_{13}H_{14}ON_2Br_2 \cdot H_2O$.

On bromination in acetic and sulphuric acid mediums, a yellowish dibromo product, M.P. 250–252° C., analyzing for $C_{13}H_{14}ON_2Br_2 \cdot H_2O$ in both cases.

On treatment of the bromo product $$(C_{13}H_{14}ON_2Br_2 \cdot H_2O)$$

with 10% ammonia, a monobromo derivative, M.P. 220° C.

On reduction with zinc and hydrochloric acid, a base analyzing for $C_{13}H_{18}ON_2$, M.P. 199° C., showing no depression in M.P. on admixture with an authentic sample of tetrahydroharmine.

Fairly soluble in mixtures of benzene and methanol, or benzene and ethanol, sparingly soluble in these solvents individually, and nearly insoluble in ether and petroleum ether, crystallizing from these solvents in light amber prismatic plates.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the isolation of an alkaloid "harmidine" from *Peganum harmala*, which comprises the steps of:
    (a) leaching powdered seeds of *Peganum harmala* with an alcohol selected from the group consisting of methanol and ethanol to form a solid residue and an extract;
    (b) removing the alcohol from the resulting extract to obtain a viscous residue;
    (c) partitioning the resulting viscous residue between water and petroleum ether, thereby obtaining an ethereal and an aqueous phase;
    (d) treating the aqueous phase with ammonia to bring the pH from the original 4.5 to 6.5 and then with ammonium sulphate, removing the resinous impurities, charcoaling the solution and filtering;
    (e) adding a concentrated solution of potassium iodide to the filtrate and collecting the resulting precipitate of crude hydroiodides of the bases;
    (f) dissolving the crude hydroiodides in hot dilute alcohol, charcoaling and filtering through a hot funnel, and cooling the resulting clear solution, thereby obtaining a golden yellow crystallizate of the hydroiodide;

(g) treating the hydroiodide with dilute ammonia with slight warming, and collecting the liberated buff coloured bases, and dissolving the liberated bases in dilute acetic acid, keeping the pH of the solution at about 6–6.5;

(h) adding dilute ammonia to the clear acetic acid solution of the bases till the pH is brought to about 7.2, heating the solution to hydrolyze the acetate of harmine, filtering off the base while hot, and repeating this step with the filtrate showing a reduced pH around 6.8 till there is no further precipitation of the base at pH 7.4 while hot; and (i) treating the final filtrate obtained in step (h) with an excess of ammonia to bring the pH above 8, to produce the alkaloid harmidine.

2. The process of claim 1 comprising the further step of purifying the base thus obtained through crystallization from a solvent mixture selected from the group consisting of benzene plus methanol; and benzene plus ethanol, leading to the crystalline alkaloid, M.P. 257–258° C.

References Cited

Rozenfeld: Chemical Abstracts, vol. 25 (1931), p. 2811.
Raymond-Hamet Compt. Rend. Soc. Biol., vol. 135 (1941), pp. 69–73.

JAMES A. PATTEN, *Primary Examiner.*

N. S. RIZZO, *Examiner.*